(12) United States Patent
Klingbeil

(10) Patent No.: US 6,172,472 B1
(45) Date of Patent: Jan. 9, 2001

(54) CONTROL SYSTEM FOR A TWO-TERMINAL ELECTRIC MOTOR CONNECTED TO A VOLTAGE NETWORK HAVING TWO LINES

(75) Inventor: Thomas Klingbeil, Bottrop (DE)

(73) Assignee: Westfalia Werkzeuggompany Gesellschaft mit Beschrankter Haftung, Hagen (DE)

(*) Notice: Under 35 U.S.C. 154(b), the term of this patent shall be extended for 0 days.

(21) Appl. No.: 09/162,897

(22) Filed: Sep. 29, 1998

(30) Foreign Application Priority Data

Sep. 29, 1997 (DE) .............................. 197 42 916

(51) Int. Cl.⁷ ................. H02P 1/24; H02P 5/06
(52) U.S. Cl. ............... 318/244; 318/809; 318/432; 388/937; 388/801; 388/809
(58) Field of Search ...................... 318/432, 434, 318/244–245, 807–811; 388/801–806, 809–824, 937

(56) References Cited

U.S. PATENT DOCUMENTS

| | | | |
|---|---|---|---|
| 4,021,700 | * | 5/1977 | Ellis-Anwyl ............... 361/28 |
| 4,073,348 | * | 2/1978 | Schramm et al. ........... 173/48 |
| 4,085,337 | * | 4/1978 | Moeller .................. 307/115 |
| 4,249,117 | | 2/1981 | Leukhardt et al. . |
| 4,412,158 | * | 10/1983 | Jefferson et al. .......... 318/257 |
| 4,454,459 | * | 6/1984 | Huber ..................... 388/811 |
| 4,462,467 | | 7/1984 | Weingartner . |
| 4,619,162 | * | 10/1986 | Laere ...................... 81/464 |
| 4,734,629 | * | 3/1988 | Lessig, III et al. ......... 388/819 |
| 4,776,406 | * | 10/1988 | Wanner ..................... 173/18 |
| 4,851,743 | * | 7/1989 | Schmerda et al. .......... 388/811 |
| 5,025,869 | * | 6/1991 | Terunuma et al. ........... 173/98 |
| 5,440,215 | * | 8/1995 | Gilmore ................... 318/432 |
| 5,495,161 | * | 2/1996 | Hunter .................... 318/807 |
| 5,577,890 | * | 11/1996 | Nielsen et al. ............ 417/44.2 |
| 5,835,676 | * | 11/1998 | Komatsu et al. ........... 388/811 |
| 5,874,816 | * | 2/1999 | Ishii ..................... 318/430 |
| 5,890,405 | * | 4/1999 | Becker .................... 81/434 |

FOREIGN PATENT DOCUMENTS

| | | |
|---|---|---|
| 23 43 661 | 3/1975 | (DE) . |
| 28 35 382 | 2/1980 | (DE) . |
| 0 659 525 | 6/1985 | (EP) . |

* cited by examiner

Primary Examiner—Brian Sircus
(74) Attorney, Agent, or Firm—Herbert Dubno

(57) ABSTRACT

A two-terminal motor can be connected to a two-line voltage supply network utilizing a controller in which a control element is in series with the current-measuring component and both are connected to a microcontroller.

16 Claims, 2 Drawing Sheets

CONTROL SYSTEM FOR A TWO-TERMINAL ELECTRIC MOTOR CONNECTED TO A VOLTAGE NETWORK HAVING TWO LINES

FIELD OF THE INVENTION

My present invention relates to an electric motor for a portable machine, e.g. a hand-held tool or appliance, and more particularly, to a control system for an electric motor which may be integrated in such a machine, which has two terminals connectable to the voltage supply lines and which is intended to be connected to a power supply network having two lines.

BACKGROUND OF THE INVENTION

Portable and/or hand-held machines with electric Rotors are commonly available in a variety of forms and include such machines as washing machines, electric mixers, kitchen appliances and electric tools like electric drills, electric grinders, electric saws, electric cutters operating with grinding blades, circular saws and saber saws, etc.

In the operation of such machines the load upon the electric motor can suddenly or even gradually increase and cause overloading which can result in excessive wear and other detrimental states up to complete breakdown of the machine.

With such overloading, there is even a danger to the user of the machine. For example, in the case of an electric drill, the drill bit may become jammed and the drill body itself may rotate around the drill bit to cause injury to the user.

For these reasons, such machines may be provided with electronic safety systems which prevent such overloads. Such electronic safety systems can be triggered to shut off the machine or reduce the power supplied to it upon the development of an unsafe condition. These systems can be contrasted with systems using a fuse which may burn out or a mechanical safety system with intentional break parts which rupture to prevent injury to the user. In the latter two cases, the fuse or ruptured part must be replaced.

For reliability in the electronic system it is above all important that the system be activated sufficiently rapidly to prevent injury or damage and that the triggering point be fixed with sufficient precision that the operating range in terms of load is not unnecessarily reduced.

It has been found to be a disadvantage of earlier rapidly-operating electronic safety systems that relatively complex means must be provided for determining the load current, thereby making the drill system relatively large and expensive, especially when a high degree of precision is desired. Furthermore, when the load current changes dramatically, i.e. the load current dynamics are significant, there is a tendency for the load current measurement to be inexact which requires that either the trigger point for the cut-off be lowered in terms of load current or that an unnecessarily excessive number of shutoffs be tolerated at least in the critical range.

These drawbacks, together with the fact that earlier attempts to eliminate them have increased the cost of the tool or appliance to an intolerable level or have required place for the control system to the extent that the tool or appliance is no longer sufficiently compact, have resulted in acceptance of less effective control or safety systems than have been desirable.

OBJECTS OF THE INVENTION

It is the object of this invention to provide a control system for a motor-driven machine of the type described whereby the aforementioned disadvantages are avoided.

More specifically, it is an object of th invention to provide an improved control system for a two-terminal electric motor, which can be integrated into a portable and/or hand-held machine, to be connected to a voltage supply network having two lines, which allows rapid triggering upon overload, which is of low cost, both with respect to the cost of components and to fabrication, and which can be accommodated in a comparatively small space so that compactness of the tool or appliance is not adversely affected.

Still another object of this invention is to provide a system for preventing overload of an electric motor which operates more efficiently and can be of a smaller size than conventional systems.

SUMMARY OF THE INVENTION

These objects are attained, in accordance with the invention in a system for controlling a two-terminal electric motor of a portable apparatus to be connected to a two-line supply net which comprises:

a current-measuring component connected in series with the electric motor for measuring current draw of the electric motor;

a control element responsive to the component and connected in series with the component and with the electric motor between one terminal of the electric motor and one line of the supply net, another terminal of the electric motor being connected to another line of the supply net;

a microcontroller connected to the component and to the control element for actuating the control element in response to current measured by the component to cut off operation of the electric motor or reduce power supplied thereto upon initiation in the microcontroller by the measured current of a predetermined action; and switch means for activating the electric motor.

More particularly, the control system is designed for an electric motor integrated into a portable or hand-held machine having at least two current supply terminals (C, D) which are to be connected to a voltage supply network with two network lines (A, B).

The terminal (C) (or the terminal (D)) is connected in series with a control element and a component capable of measuring the current draw of the electronic motor and via that series network to the voltage supply network line (A) (or line (B)).

The terminal (D) (or the terminal (C)) is connected with the voltage supply network line (B) (or the line (A)).

The microcontroller, i.e. the microprocessor-based controller is connected with the component measuring the current draw of the electric motor and with the control element.

The system also has a switch like, for example an on/off switch, a potentiometer, a keyboard or push-button set, or the like for activating the electric motor.

The result is a flexible adjustable overload protection since the microcontroller can be programmed with any load state to provide an exactly defined motor controlled condition so that the operational reliability and operating life of the electric motor can be significantly increased.

Advantageously, the current-measuring component can be integrated into the microcontroller, thereby providing a further saving in space.

It has been found to be advantageous to connect at least one of the voltage supply network lines to a phase detector whose output is connected to the microcontroller so that, for example, speed control of the electric motor can be provided through the microcontroller utilizing full wave, fractional phase or pulse-width modulation control.

Optionally, the microcontroller can be programmed to ensure any desired start-up relationship or characteristic, for example, a so-called soft or gradual start-up of the motor (slow increase in the speed) or can ensure that operation of the machine is initiated only after a certain condition is reached, for example, start-up only if the machine was previously in its "off" position or its on/off switch was previously in its "off" mode.

This arrangement can avoid immediate start-up of the machine following a current interruption when the switch is in its "on" position since that could be very dangerous and detrimental to the machine. The microcontroller can also be programmed to allow the overload protection to be bridged or bypassed during start-up.

Advantageously, the phase detector can be also integrated in the microcontroller to thereby further reduce the spatial requirements.

In a preferred embodiment of the invention, the microcontroller can be supplied with at least one operating parameter which can be variable and/or adjustable and which can include, for example, the rotary speed of the motor and the torque applied to the motor or to the machine so that a variety of operating states can be set in the microcontroller and, for example, maximum values or limiting values can be established for certain of the parameters.

Advantageously, the or each parameter can be adjusted by varying the external resistance, for example by setting a potentiometer or by operating a keyboard or key pad so that there will be either a stepless adjustment of the desired operating set or maximum value or the concrete inputting of a characteristic value.

In another preferred embodiment of the invention, a switch can provide the operating parameter to the microcontroller. The switch can also serve to activate the motor through its connection to the microcontroller. In this case, the switch does not have to be traversed by the load current and can be smaller as a consequence. The switch signals can be affected by the microcontroller as well to eliminate random undesired fluctuations of the parameter (smoothing of the signal) for limiting the changing speed for carrying out changes in the operating state at the behest of the operator, etc.

It has been found to be desirable, moreover, to provide a signalling device, for example, a light-emitting diode, a summer, etc., for signalling the development of critically high load states so that the operator, upon recognizing entry into the critical range, can reduce the load on the system and thereby avoid the development of an overload.

The control element can be a relay, a triac, a thyristor or a power thyristor, depending upon the particular application and cost conditions. Furthermore, the current-measuring means can include a current/voltage converter, for example, a measuring resistance or a Hall generator, preferably in conjunction with pulse shaping and amplifier circuits as may be best suited to avoid overdimensioning and the high costs associated therewith without reducing the measurement precision.

The circuit of the invention can include a further electrical load, for example, another motor, with at least two terminals (E, F) which can be included in series with a further control element and a further current-measuring unit which can be connected to the originally provided microcontroller for preventing overload.

The current supply to the control element and/or the further control element and/or the first-mentioned current measuring means and/or the further current-measuring device and/or the phase detector and/or the signalling unit or units and/or the means for supplying current for the parameter inputs and/or the microprocessor, this power supply being connected across the network lines (A, B) and forming a functional unit with the microcontroller and the other elements described. When integrated with the microcontroller, the power supply takes up little space.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
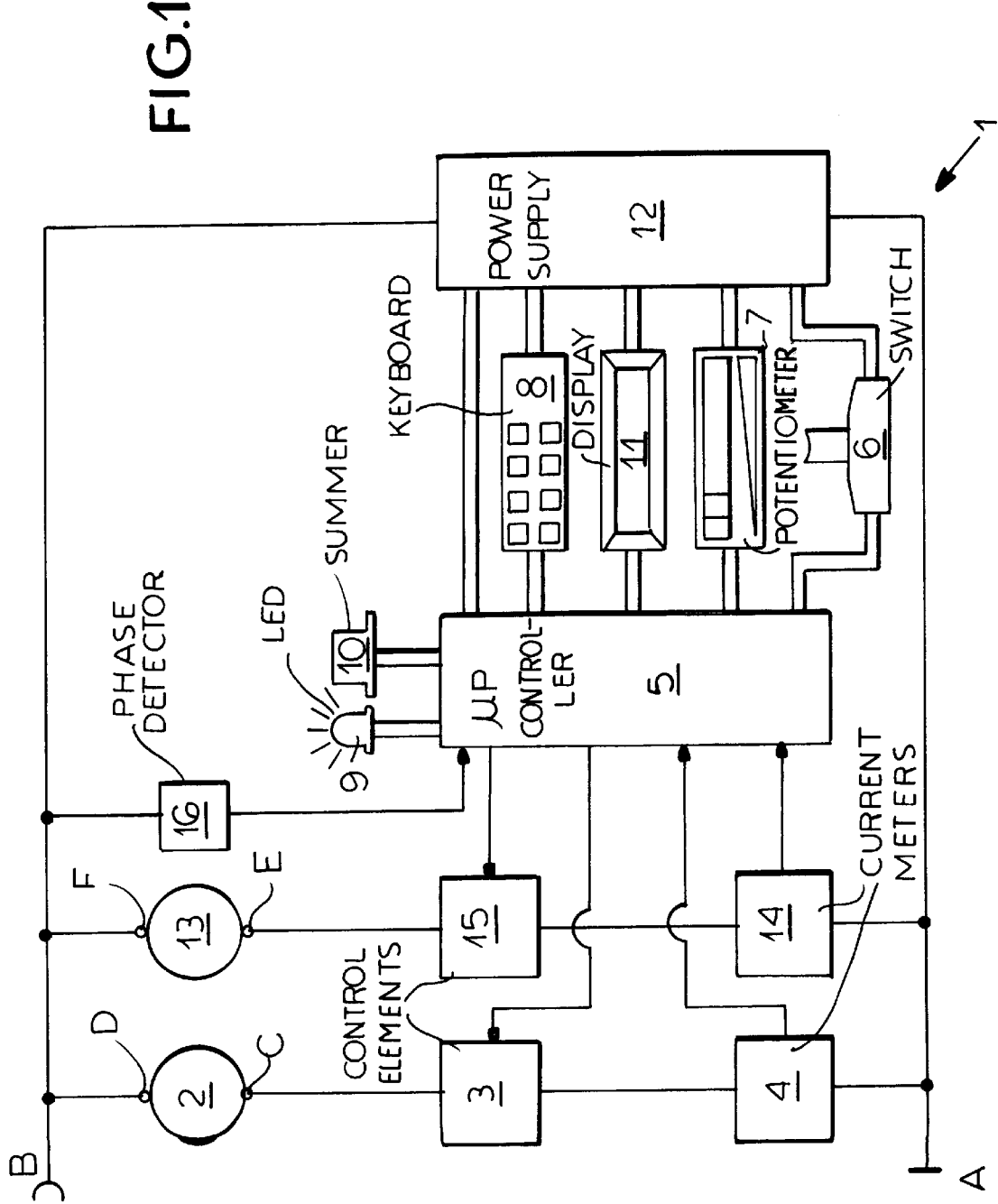
FIG. 1 is a control system according to the invention in block diagram form.

As can be seen from FIG. 1, the control system 1 for the electric motor 2 having terminals (C, D) is connected across the lines A, B of a current supply network. The electric motor 2 can be, for example, integrated into an impact-drilling machine which has not been shown in further detail in the drawing.

The terminal D is connected with the line B and the terminal C is connected to a control element 3 in series with a current-measuring device 4, which is connected, in turn, to the other line A.

Figure 2:
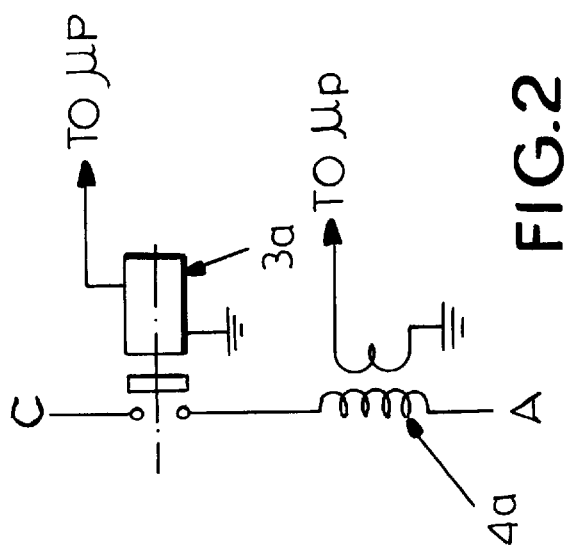
FIGS. 2–5 are circuit diagrams of a control element and current-measuring component network in various embodiments of the invention.
Figure 4:
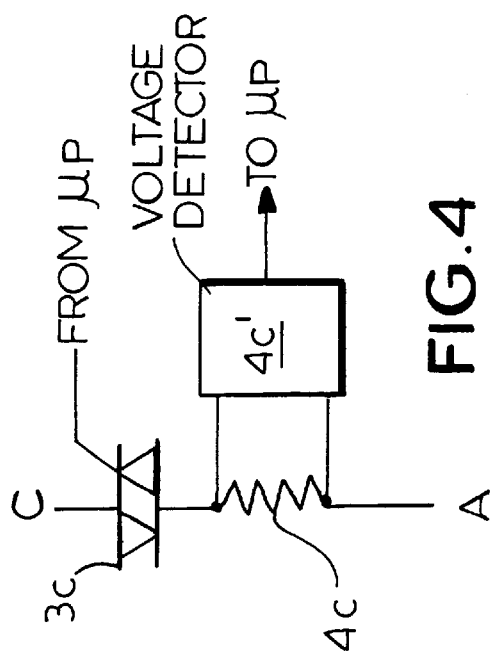
Figure 5:
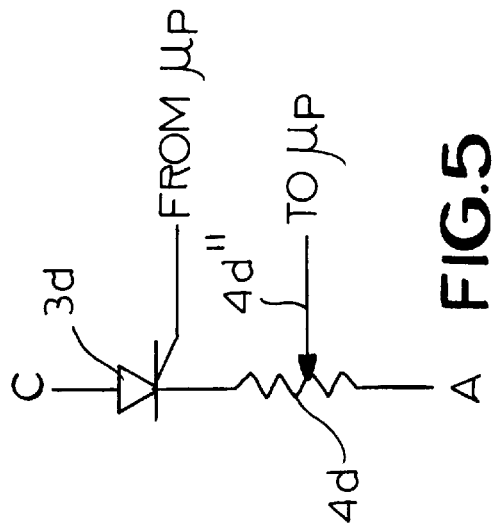

As can be seen from FIG. 2, the control element can be a relay 3a (FIG. 2), a power transistor 3b (FIG. 3), triac 3c (FIG. 4) or a thyristor 3d (FIG. 5).

Figure 3:
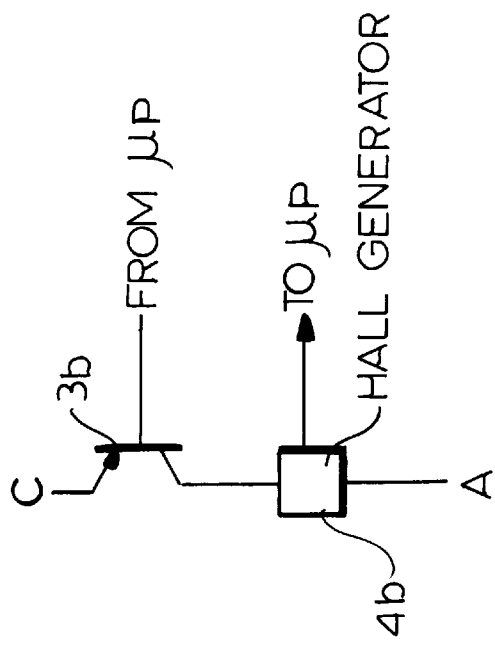

The current-measuring device may be some form of I/V converter, i.e. a current-voltage converter. In FIG. 2, for example, the current-measuring device 4a is a current transformer whereas the device 4b of FIG. 3 is a Hall generator. The current-measuring device can be a resister 4c (FIG. 4) from which the voltage can be tapped by a voltage detector 4c' or, as in FIG. 5, a resister 4d from which the voltage is tapped at 4d'.

Both the control element 3 and the current-measuring unit 4 are connected with a microcontroller 5.

A potentiometer with an on/off switching function forms the switch 6 which is connected to the microcontroller 5 and serves to turn the drill on and off. A potentiometer 7 serves as a rotary switch forming another input for the microcontroller 5 and a key pad 8 is likewise provided as an input to the microcontroller. A liquid crystal display 11 is connected to the microcontroller to display the setting thereof and/or the operating state of the drill. A power supply 12 is connected to the lines A and B and services the key pad 8, the display 11, the potentiometer 7, the switch 6 and the microcontroller 5.

The hammer mechanism of the impact drill can be driven by a further electrical load 13, for example, another electric motor with terminals E and F. The terminal F is connected to line B and the terminal E is connected in series with series network of a current-measuring unit 14 and a control element 5. The control element 5 and the current-measuring unit 14 may be connected to the microcontroller 5 as has been described for the first-mentioned drill element and current meter.

Furthermore, a phase detector 16, which can be connected to the line B and has an output tied to the microcontroller 5 can be provided to enable full-wave split-phase speed control or like control of the electric motor 2.

Via the potentiometer 7 and the key pad 8, certain operating states are preprogrammed in the microprocessor as displayed on the display 11 and these operating states can be selected by the key pad or the potentiometer. The switch 6 can be operated to turn on the impact drill.

Microcontroller 5 regulates the speed of the electric motor 2 and the load 11 and processes the data with respect to the current draw detected by the components 4 and 14. Based upon the programming of the microprocessor and the setting of the potentiometer 7 and the key pad, the microprocessor 5 controls the element 3 and further element 15. If a critical load level is reached, the LED 9 is illuminated and the adder 10 begins to total. If the load state does not change and operation continues in the critical region, depending on the programming of the microprocessor, either after a predetermined time interval or based upon a degree of overloading, there is a reduction in the power or a complete shutdown of the hammer drill. To the extent that the microcontroller has been correspondingly programmed, the rate of increase in loading can be improved and, in the case of an excessively high rise rate, the power can be reduced or compete shutdown effected. Additional functions can be programmed into the microcontroller which, for example, may bypass the overload system during start-up, can operate the start-up in accordance with a certain time course for so-called gentle and/or soft start-up, and/or can ensure that the machine will only turn on from the "off" position of the on-off switch.

I claim:

1. A system for controlling a two-terminal electric motor of a portable apparatus to be connected to a two-line supply net, said system comprising:

a current-measuring component connected in series with said electric motor for measuring current draw of said electric motor;

a control element responsive to said component and connected in series with said component and with said electric motor between one terminal of the electric motor and one line of said supply net, another terminal of said electric motor being connected to another line of said supply net;

a microcontroller connected to said component and to said control element for actuating said control element in response to current measured by said component to cut off operation of said electric motor or reduce power supplied thereto upon initiation in said microcontroller by the measured current of a predetermined action, said current-measuring component being integrated in said microcontroller switch means for activating said electric motor; and a phase detector integrated in said microcontroller and connected to at least one of said lines and having an output connected to said microcontroller.

2. The system defined in claim 1, further comprising means for controlling said microcontroller in response to at least one variable operating parameter including motor speed or machine torque.

3. The system defined in claim 2, further comprising means for adjusting said parameter.

4. The system defined in claim 3 wherein said means for adjusting said parameter includes at least one potentiometer connected to said microcontroller.

5. The system defined in claim 2 wherein said means for controlling said microcontroller includes at least one switch connected thereto.

6. The system defined in claim 1 wherein said switch means includes an on/off switch connected to said microcontroller.

7. The system defined in claim 1, further comprising means connected to said microcontroller for signaling a critically high load applied to said electric motor.

8. The system defined in claim 7 wherein said means connected to said microcontroller for signaling a critically high load applied to said electric motor includes a light-emitting diode and a summer.

9. The system defined in claim 1 wherein said element is a relay.

10. The system defined in claim 1 wherein said element is a triac.

11. The system defined in claim 1 wherein said element is a thyristor.

12. The system defined in claim 1 wherein said element is a power transistor.

13. The system defined in claim 1 wherein said component includes a current/voltage converter.

14. The system defined in claim 1 wherein said component includes a measuring resistor.

15. The system defined in claim 1 wherein said component includes a Hall generator.

16. The system defined in claim 1, further comprising at least one further electrical load having two terminals, at least one further control element in series with the terminals of said further load, and at least one further current-measuring component in series with said further element and said terminals of said further load, said further component and said further element being connected to said microcontroller.

* * * * *